United States Patent [19]
Labarbera

[11] Patent Number: 6,089,257
[45] Date of Patent: Jul. 18, 2000

[54] RADIATOR/CONVECTOR VALVE GUARD

[75] Inventor: Vito Labarbera, Staten Island, N.Y.

[73] Assignee: Brooklyn Guard, Inc., Brooklyn, N.Y.

[21] Appl. No.: 09/314,421

[22] Filed: May 18, 1999

[51] Int. Cl.[7] .................................................. F16K 35/00
[52] U.S. Cl. .......................................... 137/382; 137/377
[58] Field of Search ...................................... 137/377, 382, 137/385

[56] References Cited

U.S. PATENT DOCUMENTS

| | | |
|---|---|---|
| 1,186,733 | 6/1916 | Bastian . |
| 1,307,194 | 6/1919 | Follick . |
| 1,357,463 | 11/1920 | McCarthy . |
| 1,524,358 | 1/1925 | Johnson et al. .......................... 137/382 |
| 2,838,064 | 6/1958 | Schieberl ................................. 137/382 |
| 2,945,294 | 7/1960 | Courtot . |
| 3,980,099 | 9/1976 | Youngblood ............................. 137/382 |
| 4,033,372 | 7/1977 | Bowman .................................. 137/382 |
| 4,215,581 | 8/1980 | Bolick et al. ............................. 73/431 |
| 4,324,196 | 4/1982 | Molgaard ................................. 137/383 |
| 5,092,359 | 3/1992 | Wirth ...................................... 137/382 |
| 5,094,265 | 3/1992 | Jackson .................................. 137/382 |
| 5,119,844 | 6/1992 | Cannon ................................... 137/382 |
| 5,588,316 | 12/1996 | Jones . |
| 5,638,858 | 6/1997 | Gettinger ................................ 137/382 |

FOREIGN PATENT DOCUMENTS

2074291   10/1981   United Kingdom ................... 137/385

Primary Examiner—A. Michael Chambers
Attorney, Agent, or Firm—Herbert Dubno

[57] ABSTRACT

A guard assembly for a self-contained control valve for a steam or hot water radiator/convectors has a cage formed by a number of rings to which straps are welded and can be fitted over the pipes connected to the control valve via U-bolts clapped by saddles and nuts to the pipes. The rigid cage prevents injury to the control portion of the valve.

20 Claims, 8 Drawing Sheets

RADIATOR/CONVECTOR VALVE GUARD

FIELD OF THE INVENTION

My present invention relates to a radiator and/or convector valve guard and, more particularly, to a guard for the type of valve provided an the inlet to a radiator or a convector to protect the valve from damage or tampering, especially in cases in which the valve is provided in a school or classroom environment and may be subject to accidental or intentional contact with students or maintenance personnel.

BACKGROUND OF THE INVENTION

In institutional radiators/convectors and in radiators/convectors utilized in industrial establishments, it is not uncommon to provide along one of the pipes leading to a radiator/convector, a valve having a projecting portion which serves as a heat-control member. Thermostatic valves for this purpose include the Danfoss valve RA 2000 and like self-contained control valves for steam and hot water heating purposes.

Such valves are prone to damage in certain environments. For example, when the valves are used in radiators/convectors in schools or in classroom or gymnasium applications, the upstanding portion of the valve, i.e. the most sensitive part of the valve assembly, is frequently kicked intentionally or accidentally, stepped on, impacted by maintenance equipment or dropped articles, and is frequently damaged or destroyed, thereby rendering the valve inoperable and the radiator/convector useless. Repair and maintenance on such self-contained control valves is expensive.

Such valves may be used in commercial and industrial applications where they also may be subject to damage by vehicles riding along the floor of an industrial establishment, hand carts or the like and, indeed, the self-contained control valves can be provided in institutions and facilities, such as office facilities or environmental institutions, populated only by adults with a lesser frequency of damage but still a substantial danger to such valves.

Various attempts have been made to protect valves in the past and, for example, U.S. Pat. No. 5,094,265 describes an apparatus for locking a valve-actuating member of a control valve, utilizing a housing which is integral with a pair of legs fitting over the inlet and outlet fittings of the valve. In U.S. Pat. No. 5,119,844 a cage structure is described for protecting the valve of a pressurized air tank and in U.S. Pat. No. 1,186,733, a housing is provided to fit over a valve assembly. The stem of a valve can be locked in accordance with U.S. Pat. No. 1,357,463 and a combination lock system for controlling the flow of fuel to an automobile engine can be provided in U.S. Pat. No. 1,307,194 with a housing which encloses the actuating member of a valve. A safety guard for a valve handle is found in U.S. Pat. No. 2,838,064 and a cage structure is provided for a propane cylinder in U.S. Pat. No. 2,945,294 and for an oxyacetyl set is found in U.S. Pat. No. 5,638,858. Other devices of this general type are described in U.S. Pat. No. 4,324,196, 5,092,359, 5,588,316 and 4,033,372.

While the valve locks and guards of these systems have specialized purposes and may be more or less successful for those purposes, none of them is readily adaptable to a Danfoss type self-contained control valve for a steam or hot water radiator/convector, particularly in school or like institutional applications.

OBJECTS OF THE INVENTION

It is, therefore, the principal object of our present invention to provide an improved guard assembly for a self-contained control valve for a radiator/convector whereby the drawbacks of earlier valve systems can be avoided and which provide protection of the sensitive parts of such a valve against intentional or accidental impact and tampering.

Another object of this invention is to provide a valve guard which can be fitted easily to such a valve and which, once in place, will have sufficient stability and rigidity to resist even the most persistent of efforts at tampering or damage.

Still another object of the invention is to provide a guard assembly of simple but strong construction which is aesthetic and yet capable of preventing damage to self-contained control valves for hot water and steam radiators/convectors, particularly in institutions such as school buildings, frequented by young people.

SUMMARY OF THE INVENTION

These objects and others which will become apparent hereinafter are attained, in accordance with the invention, in a guard assembly having a rigid cylindrical cage adapted to surround the upwardly-extending portions of a self-contained control valve for a steam or hot water radiator/convectors and which, in addition, has a pair of flanges preferably welded to that cage and formed in turn with respective U-bolts engaging around inlet and outlet pipes or spuds communicating with a valve and secured to these pipes by respective saddles held in place by nuts threaded onto the U-bolts.

The cage is preferably constituted from a plurality of tubular rings which, in turn, are welded to straps extending along generatrices of the cylinder in angularly-spaced relationship around the rings to the axially-spaced rings and the stirrups form a practically rigid cage which can be closed at its upper and by a further pair of straps arranged in cruciform pattern and welded to the uppermost ring. The entire assembly can be coated with a corrosion-resistant material, e.g. a plastic such as an epoxy by powder-spread coating or the like.

The rings are dimensioned to surround the upwardly projecting portion of the valve with clearance and, except for the U-bolts and their saddles, the cage assembly can be free from any contact with the valve.

Since, such self-contained control valves are generally provided in in-line and right-angle configurations, the cage assemblies can be constituted in like arrangements. For the in-line embodiment, for example, the two flanges can be provided on opposite sides of the cage and can have the U-bolts welded to each flange in line with each other. In the right angle embodiment, the flanges can be at right angles to one another and the respective U-bolts, which lie in planes perpendicular to the flanges, can also be orthogonal to one another. In an angled configuration with the cage axis in line with the valve spud and the radiator/convector inlet, the rings can be in vertical planes.

The flanges can be formed as flanges of angle irons which are welded to a pair of straps of the cage or to a ring thereof.

The cage can be molded in one piece of plastic or can be assembled, by thermal or ultrasonic welding, from separate parts.

The rings and straps can be composed of round (tubular or nontubular) stock if desired.

BRIEF DESCRIPTION OF THE DRAWING

The above and other objects, features, and advantages will become more readily apparent from the following description, reference being made to the accompanying drawing in which.

SPECIFIC DESCRIPTION

Figure 2:
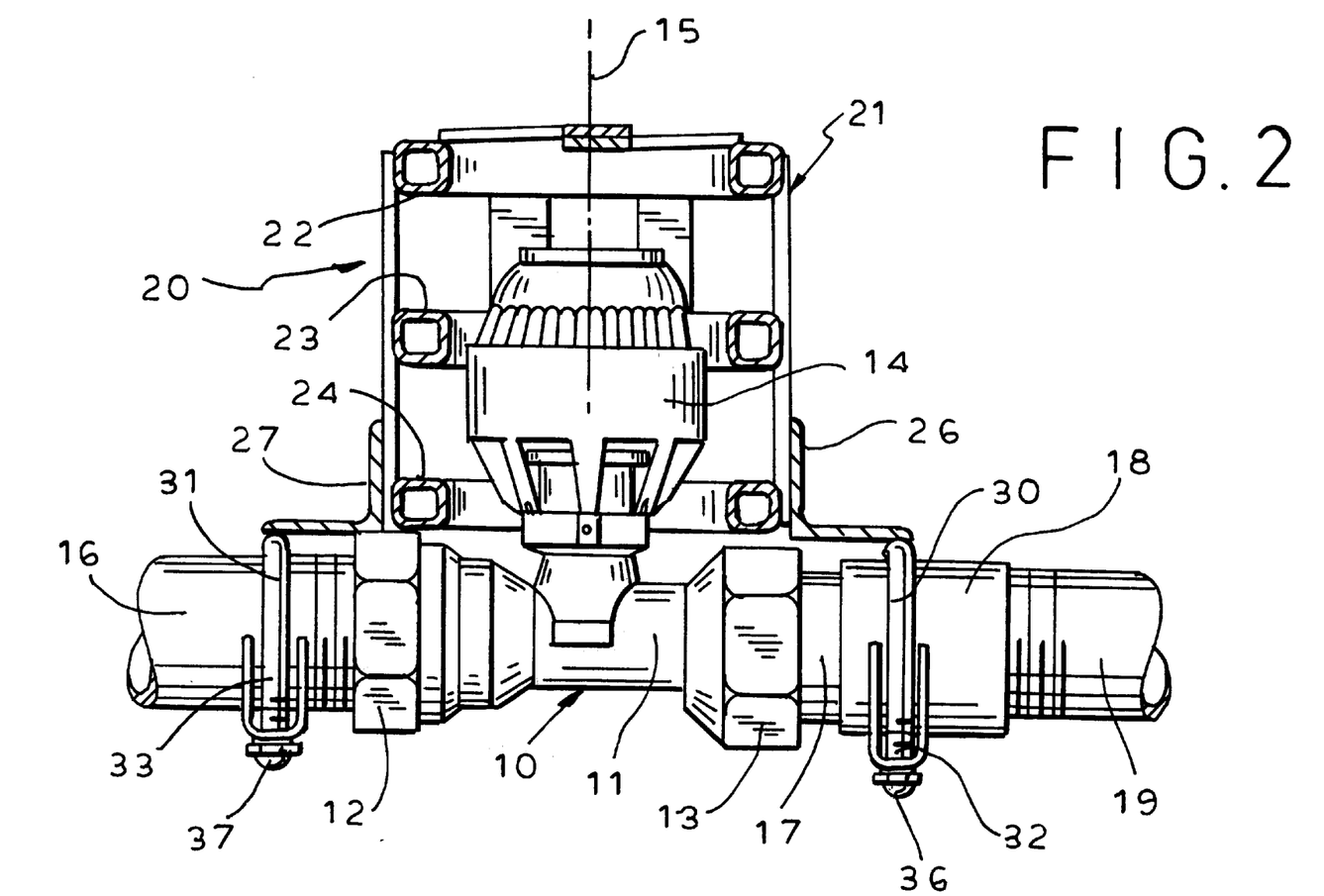
FIG. 2 is a view of that guard assembly in cross section along the line II—II of FIG. 1 and in cross section along the line II—II of FIG. 3.

From FIG. 2 it will be apparent that the self-contained control valve 10 with which the guard assembly of the invention is intended to be used, can comprise a valve body 11 with fittings 12 and which can form an inlet and an outlet and a control portion 14 which can extend upwardly from the body 11 along the axis 15. Into the fittings 12 and 13, valve spud 16 and pipe 17 can be threaded, the latter being shown to have a coupling 18 threaded onto it. The coupling 18 receives a further pipe 19.

The guard assembly 20 (see also FIGS. 1 and 3) comprises a cage 21 which is composed, in this embodiment, of three tubular steel rings 22, 23, 24 which are of generally rectangular, here generally square, cross section, the rings being axially spaced along the axis 15 and aligned with one another to define a cylinder along generatrices of which angularly equipped spaced straps 25 extend. The straps 25 are welded to the rings 22, 23, 24 and in the embodiment illustrated in FIGS. 1–3, eight such straps are provided. A pair of angles 26, 27 are welded to pairs of straps 25 on opposite sides of the cage and have respective legs 28 and 29 which are parallel to the pipe segments 16 and 17 and to one another. To these legs 28 and 29, U-bolts 30 and 31 are welded. The shanks of each U-bolt are threaded as shown at 32 and 33 and pass through sheet metal saddles 34 and 35 which engage around the pipe segment 16 and the coupling 18 and are clasped against the latter by decorative or cap nuts 36 and 37 threaded onto the shanks of the U-bolts. Closing the ring 22 and hence the upper end of the cylinder, are a pair of straps 40 and 41 in a cruciform pattern, welded to the ring 22 and, if desired, welded to one another where they cross.

Figure 1:
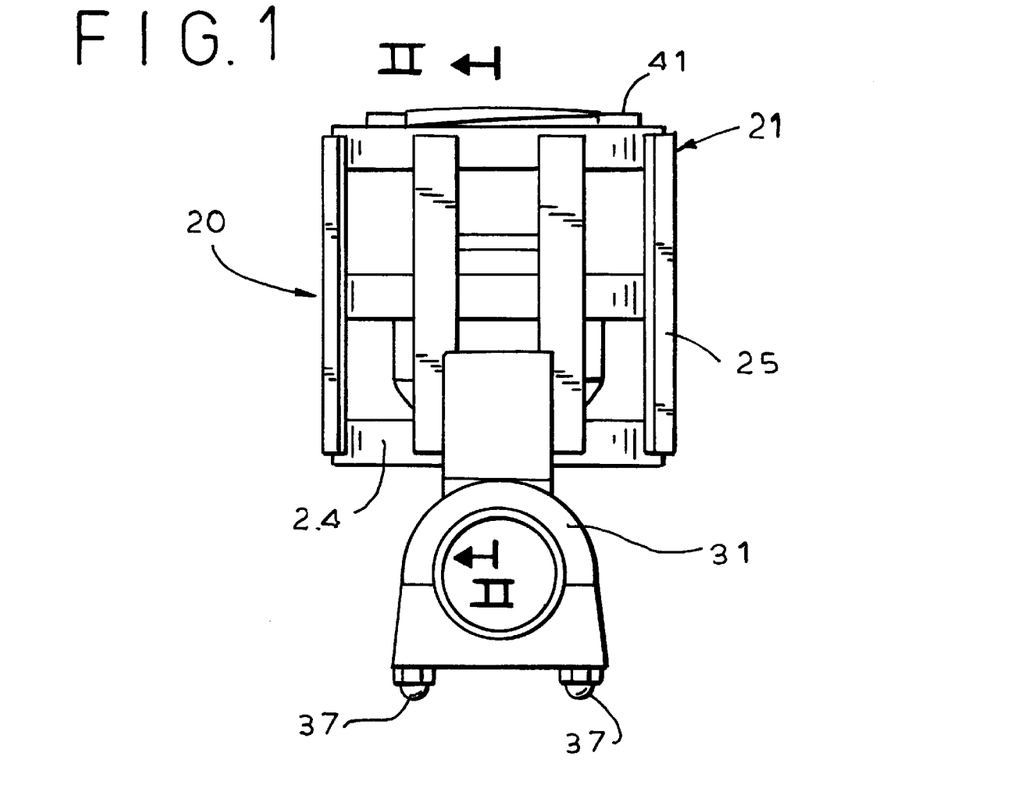
FIG. 1 is an elevational view of a guard assembly for a self-contained control valve according to the invention.
Figure 3:
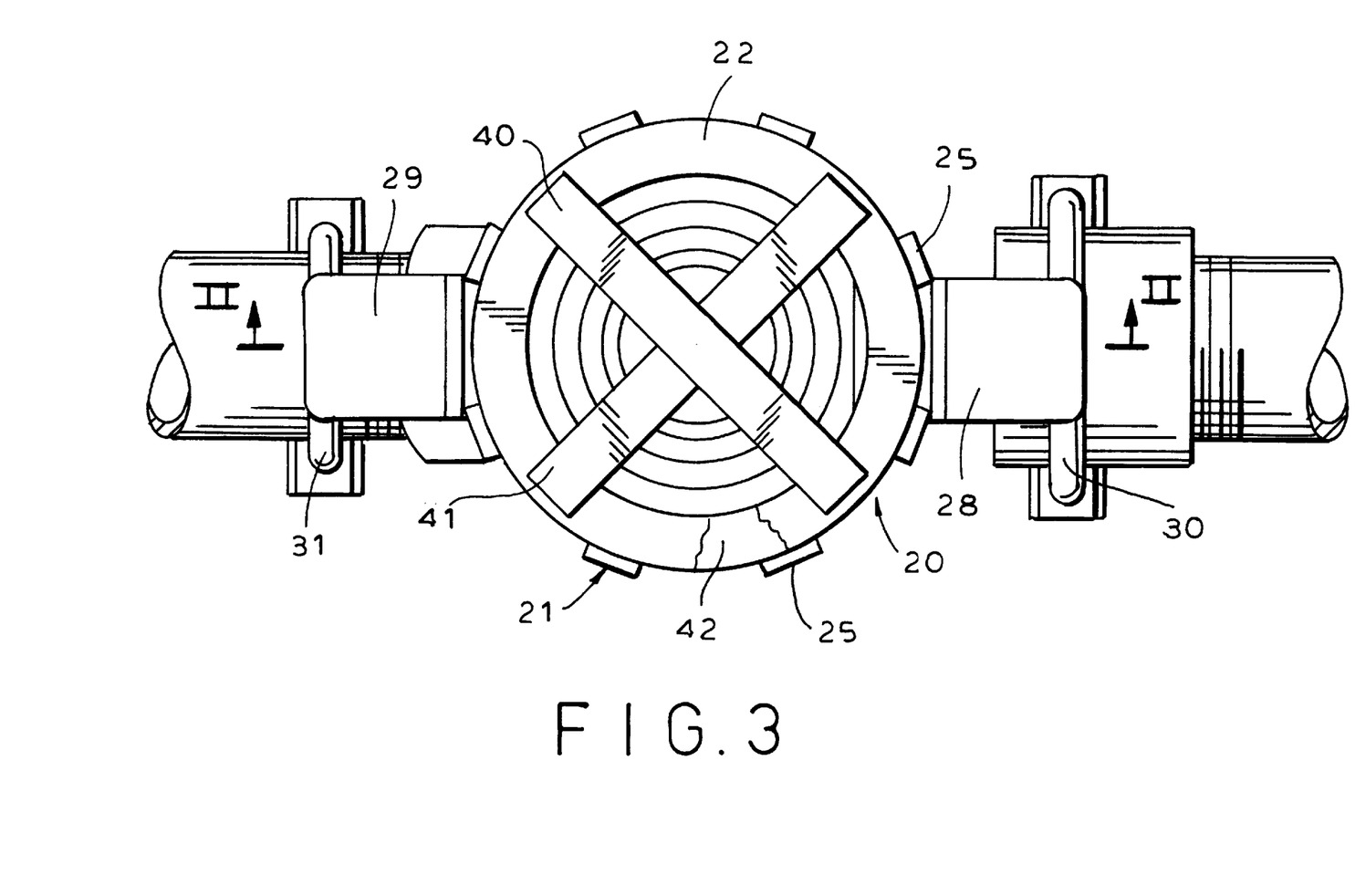
FIG. 3 is a plan view of this carriage assembly.
Figure 4:
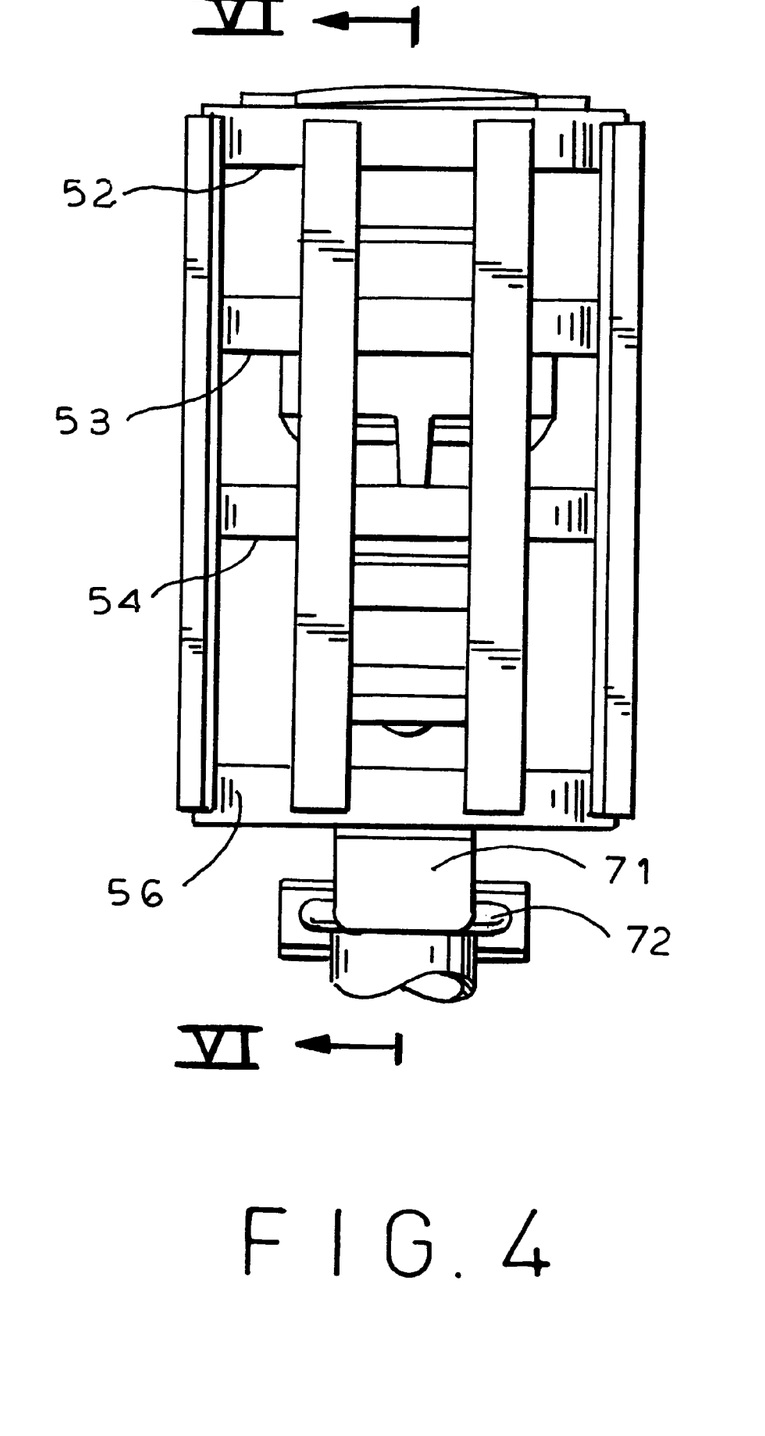
FIG. 4 is a view similar to FIG. 1 illustrating another embodiment of the invention.
Figure 5:
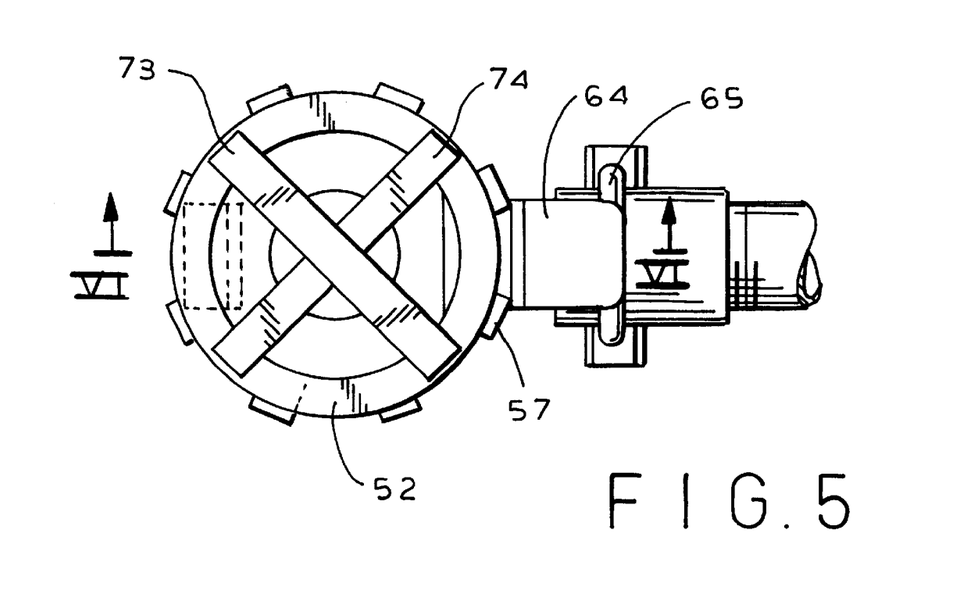
FIG. 5 is a plan view of this other embodiment.
Figure 6:
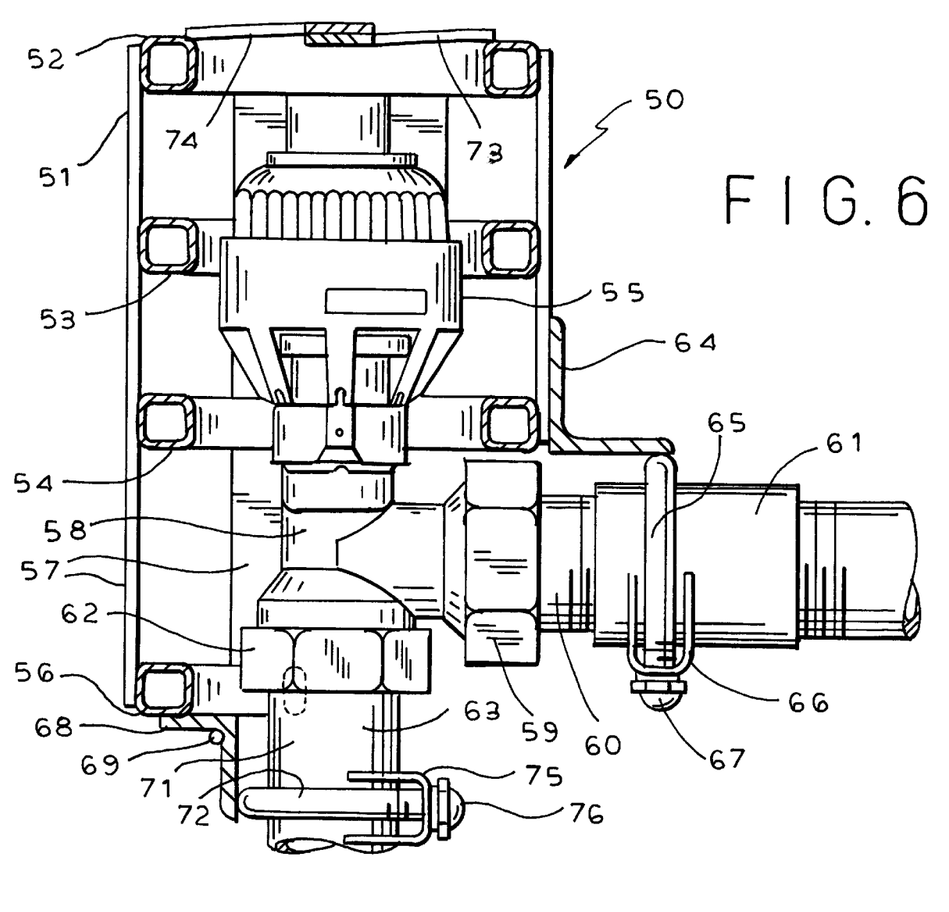
FIG. 6 is a cross sectional view along the line VI—VI in FIG. 4 and FIG. 5.

The entire cage including the rings 22–24, the straps 25, 40, 41, the angles 26 and 27 and, if desired, the U-bolts 30, 31 and the saddles 34, 35 can be coated as shown at 42 with a continuous corrosion-resistant coating which can be a paint on which preferably, an electrically-applied powder coating of a plastic which is fused at an elevated temperature to the metal parts.

The cage is simply over the valve so that the U-bolts 30 and 31 straddle the pipe section 16 and the coupling 18, whereupon the saddles 34 and 35 are applied from beneath and locked in the place by the nuts 36 and 37. The angle 27 can brace upon the facetted formation 12 of the valve body 11. The rigid cage prevents damage to the control portion 14 of the valve from a kick or from a falling or laterally-moving object.

The self-contained control valve shown in FIGS. 1–3 is of the in-line type and hence the flanges 28 and 29 are coplanar with one another.

The cage, with or without the flanges and with or without the U-bolts, can be made of plastic, if desired, as a molded unit.

In the embodiment of the guard 50 shown in FIG. 2, the cage 51 is shown to be formed by rings 52, 53 and 54 surrounding the upper part of the valve, namely, the control portion 55 as has been described in connection with FIGS. 1–3, and a ring segment 56 which is generally semicircular but aligned with the rings 52–54 and connected thereto by straps 57 welded to the rings. In this case, the valve body 58 has a fitting 59 provided with a valve spud 60 and a coupling 61, and a fitting 62 at a right angle to the fitting 59 and whose pipe segment 63 is orthogonal to the coupling 61. Here the angle 64 is welded to the straps 57 and to the U-bolt 65 straddling the coupling 61 and is provided with the saddle 66 and nut 67. However, the other angle 68 has a hinge 69 between its leg 70 welded to the lower ring segment 56 and the leg 71 welded to the U-bolt 72. Thus the flange 71 can be swung outwardly to swing the U-bolt 72 into place around the pipe segment 63. The cylinder formed by the ring is closed by the cruciform arrangement of the straps 73 and 74 welded to the ring 52. Except as to the manner in which the cage is mounted over the valve, the two embodiments are similar to saddles 66 and 75 are secured by nuts 67 and 76 to the respective U-bolts.

Figure 7:
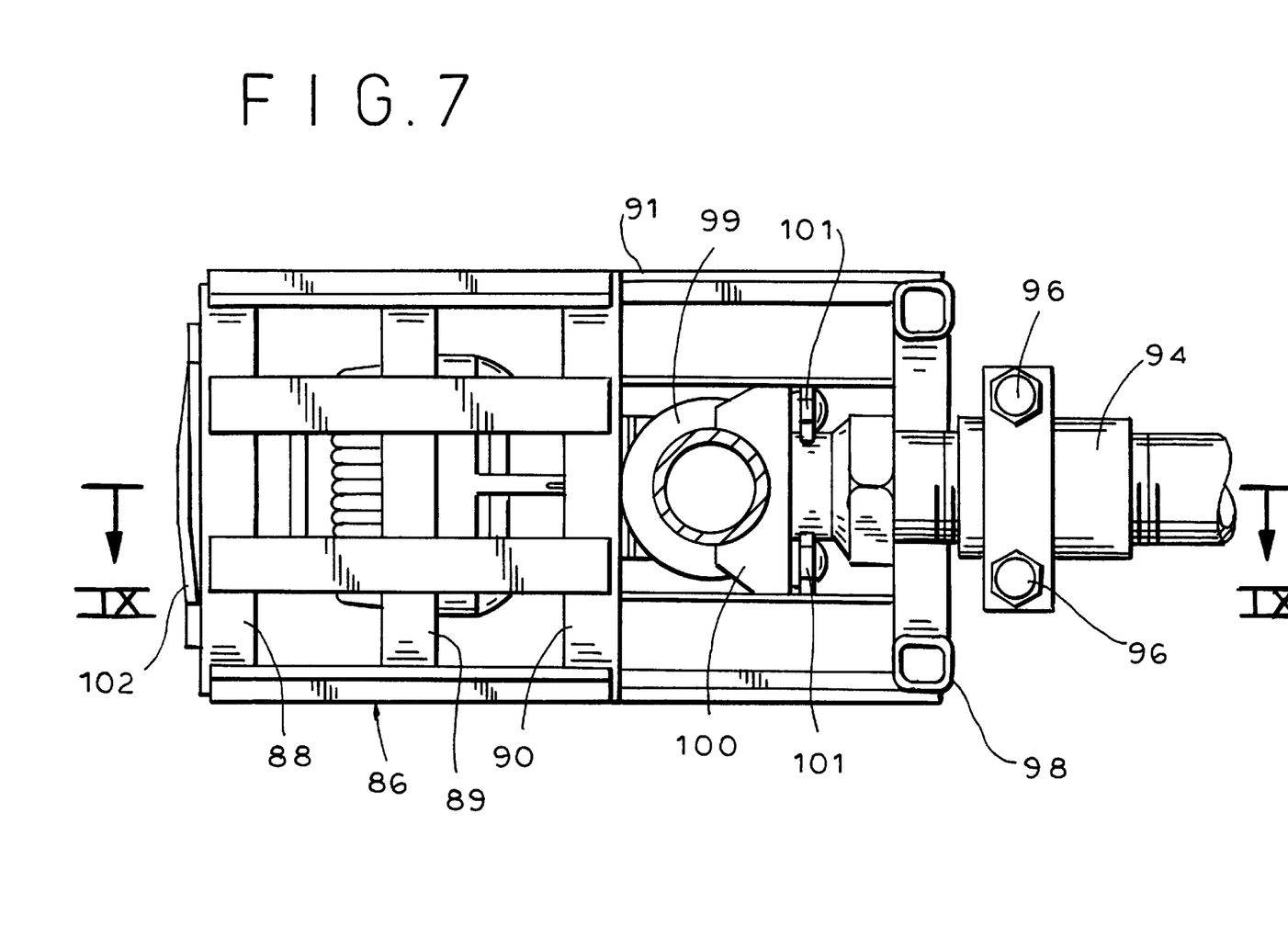
FIG. 7 is a view similar to FIG. 1 illustrating still another embodiment of the invention.
Figure 8:
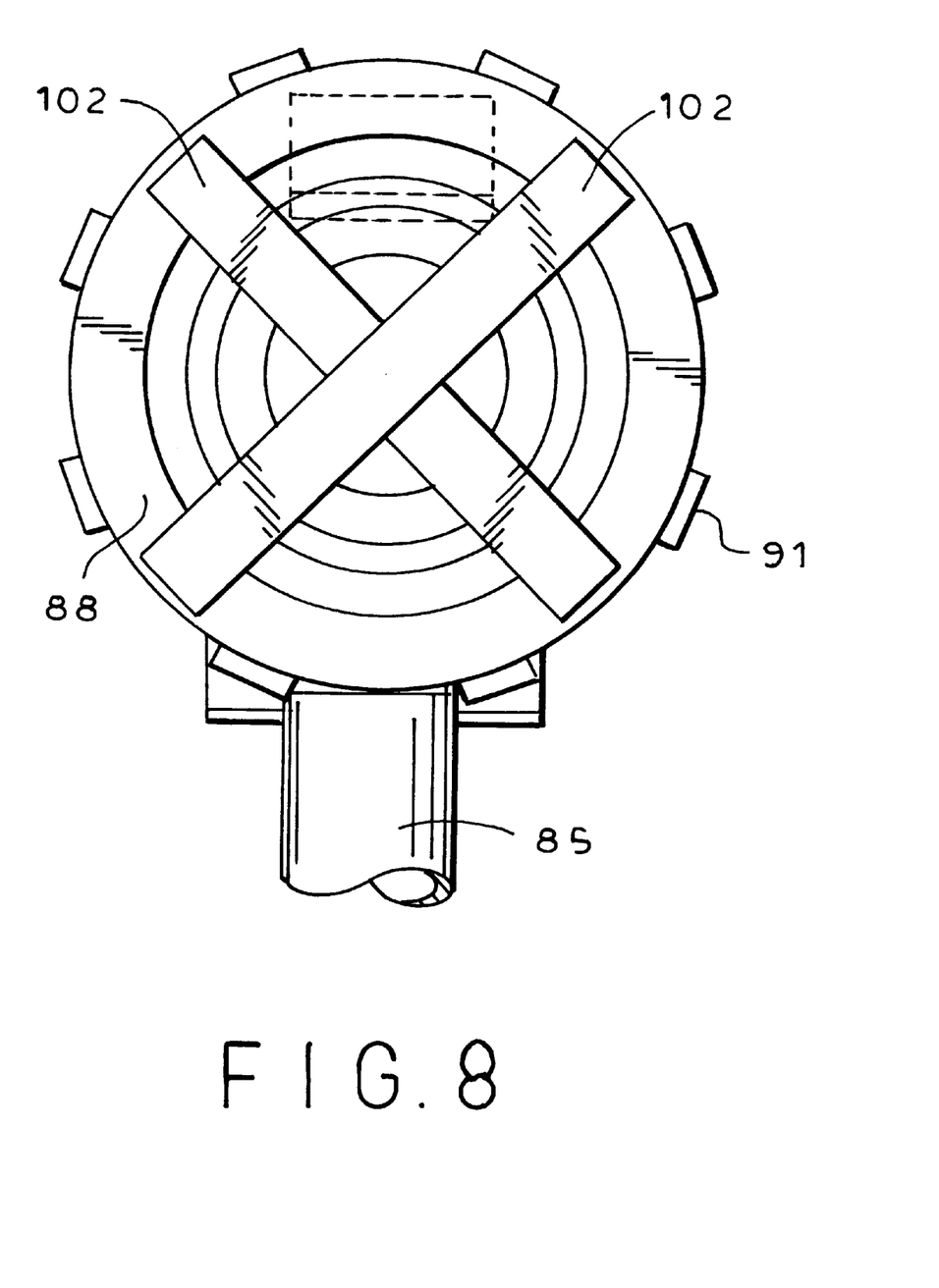
FIG. 8 is an end view of this third embodiment.
Figure 9:
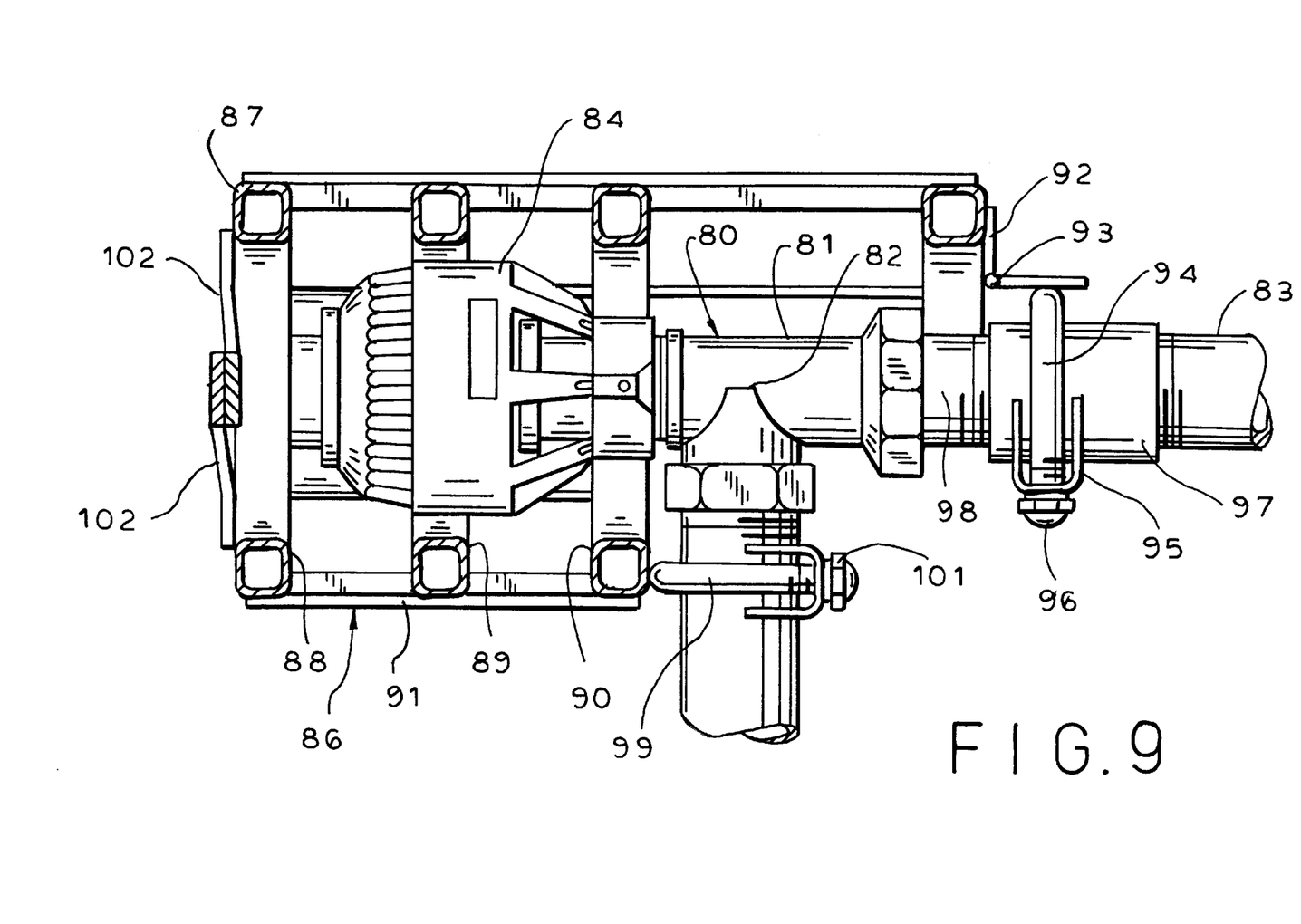
FIG. 9 is a cross sectional view taken along the lien IX—IX of FIG. 8.

FIGS. 7–9 are views corresponding to FIGS. 1–3 and FIGS. 4–6, respectively, but illustrating the application of the radiator/convector guard to a self-contained control valve 80 which is oriented so that its valve body 81 has its axis 82 in line with the pipe 83 connecting that valve to the radiator or convector.

In this case, the sensor element 84 of the valve also has a horizontal axis and projects from the valve 80 at the side thereof most remote from the radiator or convector so that temperature detection is less affected by proximity to the radiator. The supply pipe 85 is connected to the hot water or steam source.

In this embodiment, the guard 86 has a cage 87 made up of a series of spaced-apart rings 88, 89, 90, to which straps 91 are welded in the manner which has been described. The straps and rings can be molded or cast as a unitary structure if desired. The semicircular ring segment 91 can be provided and to this segment, a flange 92 of a hinge 93 carrying the U-bolt 94 can be welded. The U-bolt 94 is secured via a saddle 95 and nuts 96 to the pipe coupling 97 which connects the valve spud 98 with the pipe 83. The other U-bolt 99 is connected by the saddle 100 and the nuts 101 to the supply pipe 85 and is welded to the ring 90. The cage 96 of the embodiment of FIGS. 7 and 8 can be closed by straps 102 welded to the ring 88 in the-manner previously described. In this embodiment the U-bolt 99 is directly affixed to the ring 90 of the cage and does not require an angle therebetween.

As has already been noted, instead of rings which are of rectangular or square section, round section rings which may or may not be tubular can be used. In all of the embodiments the straps 91, etc. need not be flat but can be tubular or solid and of any cross section including a circular section. When the rings, straps and other elements are composed of synthetic resin materials, they need not be coated with corrosion-resistant or decorative coatings but can be molded with decorative coloration directly.

We claim:

1. A guard assembly for a self-contained control valve for a radiator/convector wherein the self-contained control valve has a control portion extending upwardly from a valve body formed with an inlet and an outlet and wherein pipes are connected to said inlet and said outlet, said guard assembly comprising:
- a generally cylindrical rigid cage surrounding said control portion;
- respective flanges affixed to said cage and extending parallel to said pipes;
- a U-bolt secured to each of said flanges and straddling a respective one of said pipes;
- a respective saddle engaging around the respective pipe and fitting over shanks of a respective U-bolt; and
- nuts threaded onto said shanks and securing the respective saddles to said U-bolts.

2. The guard assembly defined in claim 1 wherein said cage comprises a plurality of tubular rings centered on an axis and axially spaced apart therealong, and a plurality of straps extending along generatrices of a respective cylinder welded to said rings, said flanges being welded to said cage.

3. The guard assembly defined in claim 2 wherein one of said flanges is welded to a pair of said straps.

4. The guard assembly defined in claim 3 wherein the other of said flanges is parallel to said one of said flanges and is welded to another pair of said straps opposite said one of said flanges.

5. The guard assembly defined in claim 3 wherein the other of said flanges is perpendicular to said one said flanges and is welded to one of said rings.

6. The guard assembly defined in claim 3 wherein said U-bolts are welded to the respective flanges.

7. The guard assembly defined in claim 6 wherein said nuts are decorative cap nuts.

8. The guard assembly defined in claim 6 wherein said rings are of generally rectangular cross section.

9. The guard assembly defined in claim 8 wherein said flanges are formed by respective angles.

10. The guard assembly defined in claim 9, further comprising a pair of straps in a cruciform pattern lying across a ring at an end of the respective cylinder remote from said body and welded to one another and to said ring at said end of said cylinder.

11. The guard assembly defined in claim 10 wherein said pipes are orthogonal to one another and at least one of said angles is formed with a hinge between legs thereof.

12. The guard assembly defined in claim 11 wherein said cage and said flanges are provided with a coating of a corrosion resistant material.

13. The guard assembly defined in claim 1 wherein one of said flanges is welded to a pair of said straps, and the other of said flanges is parallel to said one of said flanges and is welded to another pair of said straps opposite said one of said flanges or the other of said flanges is perpendicular to said one of said flanges and is welded to one of said rings.

14. The guard assembly defined in claim 1 wherein said U-bolts are welded to the respective flanges.

15. The guard assembly defined in claim 1 wherein said nuts are decorative cap nuts.

16. The guard assembly defined in claim 1 wherein said rings are of generally square cross section.

17. The guard assembly defined in claim 1 wherein said flanges are formed by respective angles.

18. The guard assembly defined in claim 17, further comprising a pair of straps in a cruciform pattern lying across a ring at an end of the respective cylinder remote from said body and welded to one another and to said ring at said end of said cylinder.

19. The guard assembly defined in claim 18 wherein said pipes are orthogonal to one another and at least one of said angles is formed with a hinge between legs thereof.

20. The guard assembly defined in claim 1 wherein said cage and said flanges are provided with a coating of a corrosion resistant material.

* * * * *